United States Patent [19]

Yamaashi et al.

[11] Patent Number: 5,287,440
[45] Date of Patent: Feb. 15, 1994

[54] GRAPHIC PROCESSING METHOD FOR DRAWING AN AREA DEFINED BY CLIPPING OF A VARIABLE SHAPE AND APPARATUS FOR DOING THE SAME

[75] Inventors: Kimiya Yamaashi; Shuuichi Miura, both of Hitachi; Yuji Taki, Takasaki; Atsushi Kawabata, Hitachi, all of Japan

[73] Assignee: Hitachi, Ltd., Tokyo, Japan

[21] Appl. No.: 491,826

[22] Filed: Mar. 12, 1990

[30] Foreign Application Priority Data

Mar. 20, 1989 [JP] Japan .................... 1-66215

[51] Int. Cl.⁵ ............................. G06F 15/62
[52] U.S. Cl. ................. 395/134; 395/133; 395/135
[58] Field of Search ............... 395/133–135, 395/118–123

[56] References Cited

U.S. PATENT DOCUMENTS 4,622,545 11/1986 Atkinson ..................... 340/747
4,984,183 1/1991 Ohuchi ....................... 395/134

Primary Examiner—Heather R. Herndon
Assistant Examiner—Almis Jankos
Attorney, Agent, or Firm—Antonelli, Terry, Stout & Kraus

[57] ABSTRACT

A graphic processing device is composed of a main storage device, a drawing control device and a drawing device. The main storage device stores data relative to the coordinates of plural graphics. The drawing control device reads out the data relative to the coordinates of the plural graphics stored in the main storage device, scans the coordinate data to calculate the coordinates of intersecting points of a scanning line and the plural graphics for each position of the scanning line. The drawing control device also determines an overlapping area (AND area) or a common area (OR area) of the plural graphics on the basis of the coordinates of the intersecting points of the plural graphics and the scanning line. The drawing device draws the overlapping area (AND area) and the common area (OR area) of the plural graphics as a graphic.

12 Claims, 5 Drawing Sheets

GRAPHIC PROCESSING METHOD FOR DRAWING AN AREA DEFINED BY CLIPPING OF A VARIABLE SHAPE AND APPARATUS FOR DOING THE SAME

BACKGROUND OF THE INVENTION

The present invention relates to a graphic drawing method and graphic drawing device for drawing a graphic in a specified area, and more particularly to a graphic drawing method and graphic drawing device which can draw a high-definition and high-resolution graphic with a small storage capacity when clipping any optional shape.

Previously known techniques for clipping any optional shape include a working area technique and a square clipping technique.

In the working area technique, in order to clip an optional shape, a clip frame memory having the same size as that of a frame memory is provided as a working area and a storage area, and a clipped graphic is once drawn on the clip frame memory; in actually drawing a graphic, the filling-over thereof is made with reference to the clipped graphic stored in the clip frame memory. Incidentally, as disclosed in JP-A-59-85573, a graphic can be drawn by clipping for each scanning line using a memory corresponding to one scanning line. On the other hand, in the square clipping technique, in order to clip any optional shape at a high speed, the clipped area is divided into minute square regions; in actually drawing a graphic, clipping for the plural minute regions thus formed is carried out to approximate the optional shape.

The prior art techniques mentioned above are disadvantages in that the working area technique provides inefficient use of memory since the clipping memory having a large size is required for an output device with a high resolution such as a printer. On the other hand, the square clipping technique has no problem of efficiently using memory, but it cannot be used when high drawing quality is required in e.g. a printer owing to its approximation manner.

SUMMARY OF THE INVENTION

An objective of the present invention is to provide a graphic drawing method and a graphic drawing device which can perform graphic processing with high drawing quality at a high speed and in a smaller memory storage than in the prior art.

More specifically, an objective of the present invention is to provide a graphic processing device which can perform graphic clipping processing with high memory usage efficiency and high drawing efficiency without using a memory and approximation means for clipping an optional shape, and a graphic processing system and graphic drawing method using the graphic drawing device.

In order to attain the above objective, in accordance with the present invention, there is provided a graphic processing device comprising graphic-to-be-clipped storage means for storing a graphic-to-be-clipped specifying a region-to-be-drawn; graphic-to-be-drawn storage means for storing a graphic-to-be-drawn to be defined by the region-to-be-drawn; coordinate calculation means for calculating the coordinates of intersecting points of the stored graphic-to-be-clipped, graphic-to-be-drawn and individual scanning lines; and graphic area-to-be-drawn decision means for determining an overlapping area of the graphic-to-be-clipped and the graphic-to-be-drawn on each scanning line from each coordinate value acquired by the coordinate calculation means, wherein the graphic corresponding to the overlapping area decided by the graphic region-to-be-drawn decision means is drawn.

Moreover, in order to attain the above objective, in accordance with the present invention, there is provided a method comprising the steps of Storing a graphic-to-be-clipped, specifying a region-to-be-drawn and a graphic-to-be-drawn to be defined by the region-to-be-drawn; calculating the coordinates of intersecting points of the stored graphic-to-be-clipped, graphic-to-be-drawn and individual scanning lines; determines an overlapping area of the graphic-to-be-clipped and the graphic-to-be-drawn on each scanning line from each coordinate value thus acquired, wherein the graphic corresponding to the overlapping area of the overlapping area decision means is drawn.

In operation, the graphic-to-be-clipped storage means and the drawing graphic storage means store the coordinate data, e.g. contour segment data, of a graphic-to-be-clipped and a graphic-to-be-drawn, respectively. The coordinate calculation means extracts the coordinate data (contour segment data) from the graphic-to-be-clipped storage means and the graphic-to-be-drawn storage means to acquire the coordinates of intersecting points of the coordinate data and scanning lines in raster scanning. Using the coordinates of the intersecting points, the graphic area-to-be-drawn decision means determines the overlapping area of the graphic-to-be-clipped and the graphic-to-be-drawn on each scanning line. The graphic corresponding to the overlapping area determined by the graphic area-to-be-drawn decision means is drawn. In this way, a clipping process is carried out using the coordinate values so that it is not necessary to use a clipping frame memory for determining the overlapping area. Moreover, the clipping process for clipping an optional shape can be realized without making square approximation so that it can be carried out with high memory using efficiency and high drawing quality.

It is assumed that a graphic includes a character as well as a common graphic such as a triangle.

Although the clipping process has been explained in connection with acquiring an overlapping area (AND area) of the graphic, the present invention can be applied to acquiring a common area (OR area) of the graphic.

In accordance with the present invention, unlike the prior art, the clipping frame memory for clipping any shape is not required and square approximation for the clipping is not also required so that a graphic processing device which can carry out the high speed clipping with high memory using efficiency and high drawing quality can be provided.

DESCRIPTION OF THE PREFERRED EMBODIMENTS

Figure 1:
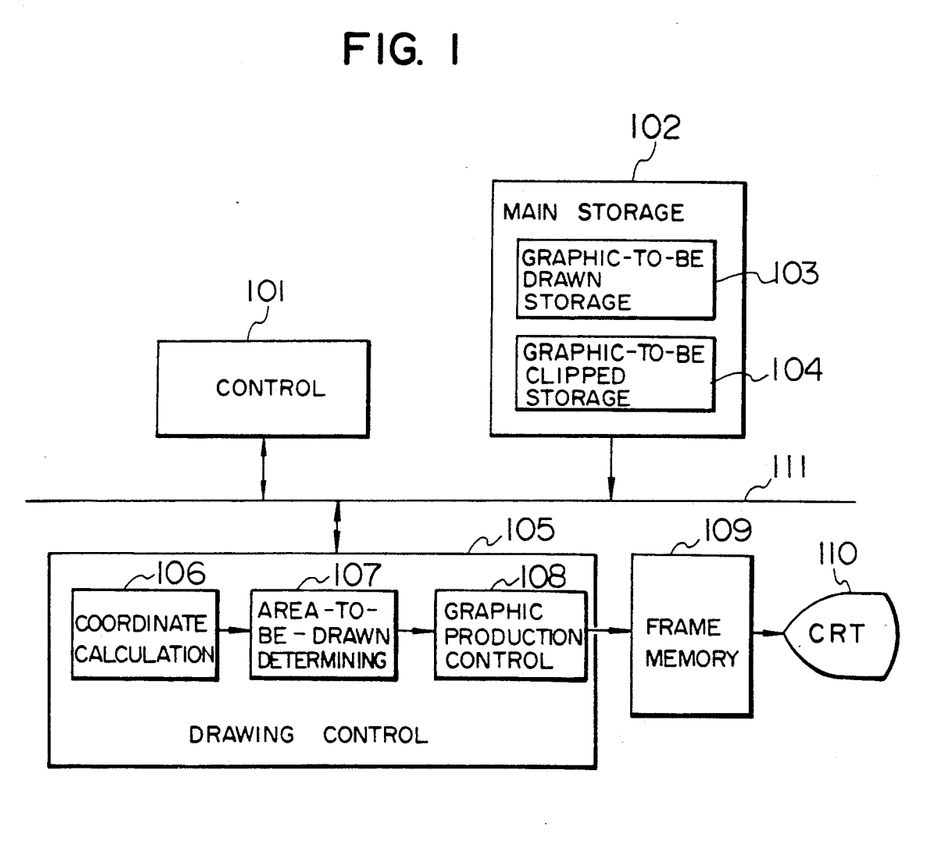
FIG. 1 is a block diagram showing an arrangement of the present invention.

An embodiment of the present invention will be explained below. An entire system arrangement of the present invention is shown in FIG. 1. A control unit 101 controls the entire system. A graphic-to-be-drawn and a graphic-to-be-clipped are stored in the corresponding storage portions 103 and 104 in main storage 102. In drawing a graphic, the control unit 101 commands that a graphic drawing unit 105 draws a graphic using the graphic information stored in the main memory 102. The graphic drawing control unit 105 extracts each item of graphic information from the main memory 102 to calculate the intersecting points of each side of a graphic-to-be-clipped and each scanning point in a frame memory 109 using a coordinate calculation unit 106. A series of coordinate points thus acquired are sent to a graphic region-to-be-drawn decision unit 107 to determine a starting point and an end point of the region-to-be-drawn from their values. A graphic creation control unit 108 fills the region-to-be-drawn on the corresponding scanning line using the starting point and the end point. By successively carrying out the above processing for each scanning line, the graphic clipped by a graphic-to-be-clipped process leased upon the coordinates of the intersecting points is stored as graphic data in the frame memory 109. The graphic stored in the frame memory 109 is drawn by a drawing device (CRT).

Figure 2:
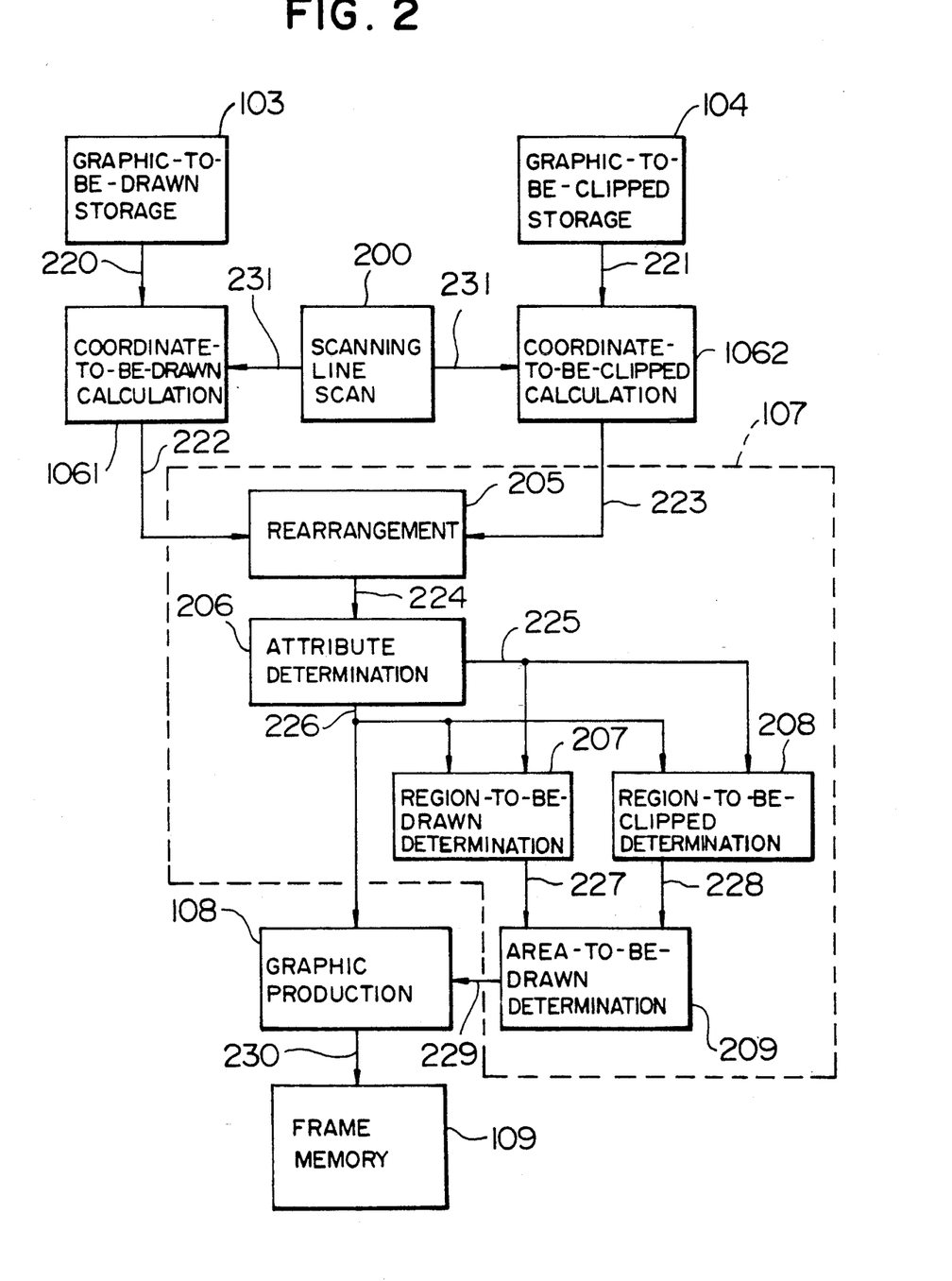
FIG. 2 is a block diagram for explaining a graphic drawing method according to the present invention.

Now referring to FIGS. 2 and 3, the process for drawing a graphic will be explained.

Figure 3:
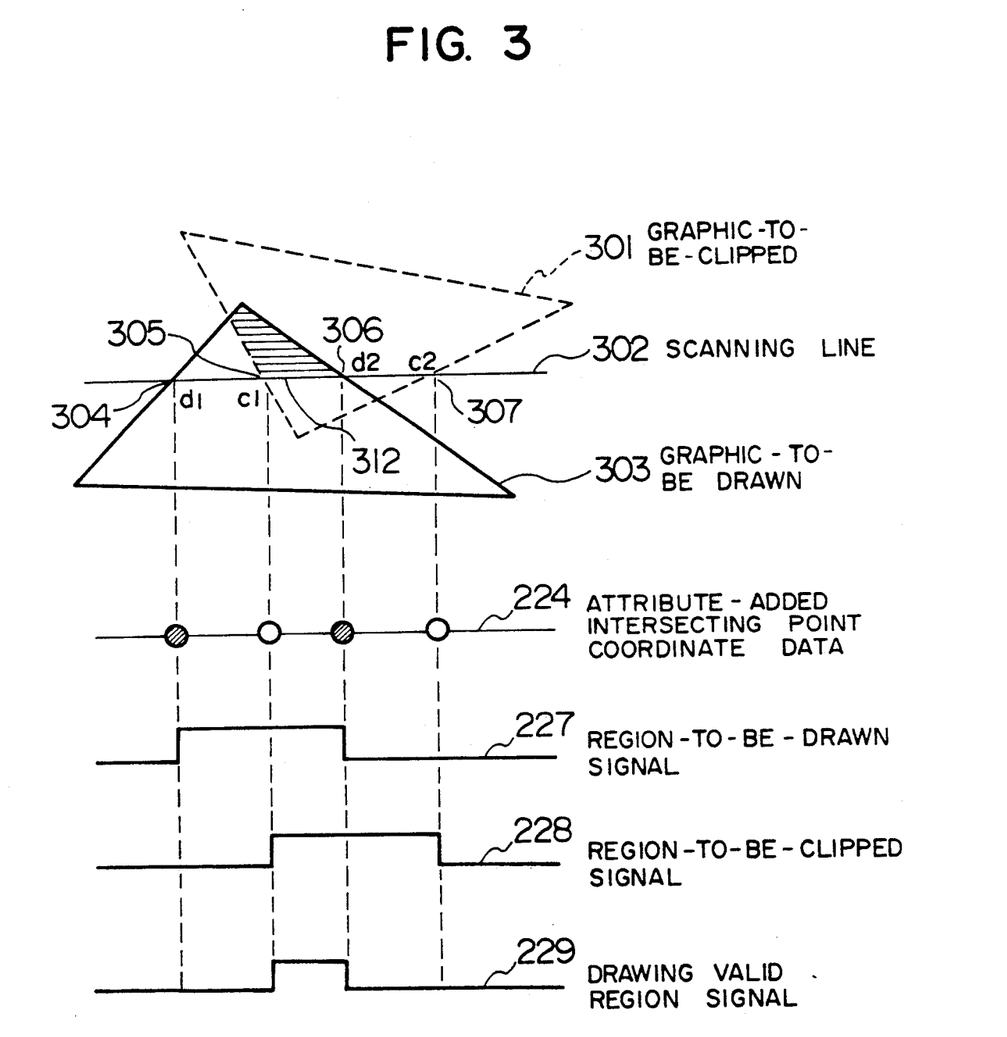
FIG. 3 is a view for explaining an example of the graphic processing method according to the present invention.

A graphic-to-be-drawn and a graphic-to-be-clipped as shown in FIG. 3 are stored in graphic-to-be-drawn storage means 103 and graphic-to-be-clipped storage means 104, respectively. A scanning-line scanning unit 200 successively updates the scanning line to be processed for filling for each scanning line in the frame memory 109. The filling for each scanning line will be explained below.

A coordinate-to-be-drawn calculation means 1061 successively extracts graphic segment data 220 from the graphic-to-be-drawn storage means 103 and calculate the intersecting points of the graphic segment data 220 and a scanning line at issue to acquire intersecting-point coordinate-data-to-be-drawn 222.

A coordinate-to-be-clipped calculation means 1062 successively extracts segment-data-to-be-drawn 221 representative of the graphic-to-be-clipped from the graphic-to-be-clipped storage means 104 and calculates the intersecting points of the segment data 221 and a scanning line at issue to acquire clipping intersecting-point-coordinate-data-to-be-clipped 223.

A rearrangement means 205 rearranges the A intersecting-point-coordinate-data-to-be-drawn 221 and the clipping intersecting-point-coordinate-data-to-be-clipped 223 in the order of a scanning direction to provide attribute-added intersecting-point coordinate data 224. The data 224 is composed of attribute values, which discriminate between the graphic-to-be-drawn data and the graphic-to-be-clipped data, and coordinate values. For example, in the case of FIG. 3, the coordinates of the intersecting points of the graphic-to-be-drawn 303 on a scanning line 302 are d1 (304), d2 (306), and those of the graphic-to-be-clipped 301 are c1 (305) and c2 (307). The rearrangement means 205 rearranges these coordinate data in the order of a scanning direction as shown in FIG. 3, i.e. in the order of d1, c1, d2 and c2.

An attribute decision means 206 extracts the attribute-added intersecting-point coordinate data 224 one coordinate at a time; it then provides an attribute decision signal 225 discriminating between the drawing graphic-to-be-drawn data and the graphic-to-be-clipped data, and also outputs an coordinate value as an intersecting-point coordinate value 226.

A region-to-be-drawn decision means 207, which is activated when the attribute signal 225 indicates the graphic-to-be-drawn, determines whether the coordinate value from the attribute decision signal 225 and the intersecting-point 226 is a starting point or an ending point of the drawing graphic. If the coordinate point is the drawing starting point, a drawing signal area signal 227 is made "ON" whereas if the coordinate point is the drawing ending point, the signal 227 is made "OFF". On the other hand, a region-to-be-clipped decision means 208, which is activated when the attribute signal 225 indicates the graphic-to-be-drawn, and determines whether the coordinate value from the attribute decision signal 225 and the intersecting-point 226 is a starting point or an ending point of the graphic-to-be-clipped. If the coordinate point is the clipping starting point, an area-to-be-clipped signal 228 is made "ON" whereas if the coordinate point is the clipping ending point, the signal 227 is made "off". In this embodiment, the region-to-be-drawn decision means 207 and the region-to-be-clipped decision means 208 decide the region-to-be-drawn and the region-to-be-clipped on the basis of an even-odd rule. More specifically, the decision means 207 and 208, if the intersecting point is located at an odd number from the left side, determines the corresponding data to be a region starting point to make the region signal "ON", and if the intersecting point is located at an even number from the left side, determines the corresponding data to be a region ending point to make the region signal "OFF". In this way, when the attribute-added intersecting-point coordinate data 224 (d1-304, c1-306, d2-305 and c2-307) are successively received as the attribute decision signal 225 and the intersecting-point coordinate value 226 through the attribute decision means 206, the region-to-be-drawn decision means 207 changes the region-to-be-drawn signal 227 as shown in FIG. 3, and the region-to-be-clipped decision means 208 changes the region-to-be-clipped signal 228.

An area-to-be-drawn decision means 209, in response to the region-to-be-drawn signal 227 and region-to-be-clipped signal 228, determines that the drawing is valid when both region signals are valid, i.e. "ON" to make a drawing valid region signal 229 "ON" as shown in FIG. 3.

A graphic production means 108 recognizes the intersecting-point 226 as a drawing (filling) starting point at the rising edge of the drawing valid region signal 229 and as a drawing ending point at the trailing edge thereof and fills the segment 312 on a scanning line delimited by the starting point and ending point on the frame memory 109.

The above operation is carried out for all the attribute-added intersecting-point coordinates 224 to fill the scanning line at issue. By carrying out the operation described above for all the scanning lines, in accordance with this embodiment, the processing of clipping any shape can be performed without using a working memory.

Incidentally, although this embodiment has been explained in connection with a common graphic, it can be applied to a character in place of the graphic.

Embodiment 2

Figure 4:
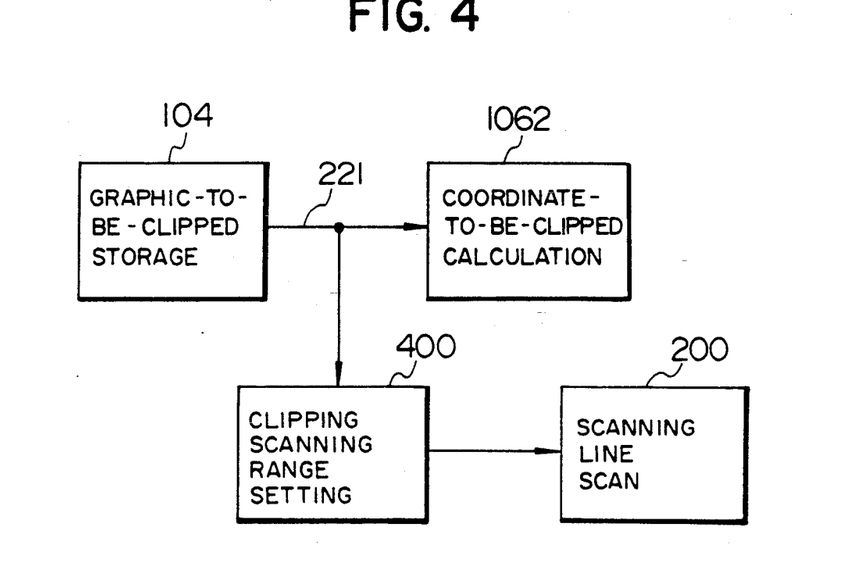
FIG. 4 is a block diagram for explaining a second embodiment of the present invention.

A second embodiment of the present invention will be explained with reference to FIG. 4. In this embodiment, in addition to the arrangement of the previous embodiment, there is provided means for setting the scanning region of a graphic-to-be-clipped. The graphic-to-be-clipped scanning region setting means is provided to acquire the minimum and maximum values of the graphic-to-be-clipped in the direction of a scanning line. Specifically, in FIG. 4, the means 400 sets the scanning region of the graphic-to-be-clipped with reference to the clipping segment data of the graphic-to-be-clipped from a graphic-to-be-clipped storage means 104. Namely, the means 400 sets the minimum and maximum scanning line values in the scanning line direction and sends these two values to a scanning line scanning unit 200. The scanning line scanning unit 200 scans, in actually drawing a graphic, only the segment of the scanning line delimited by the minimum and maximum scanning line values. In this way, by scanning only the area where a graphic-to-be-clipped is located, the clipping processing can be performed at a higher speed than in the previous embodiment. Also, means for setting the scanning region of a graphic-to-be-drawn may be provided to provide the same effect. Moreover, this embodiment may be also applied to writing a graphic as well as drawing the graphic.

Embodiment 3

Figure 5:
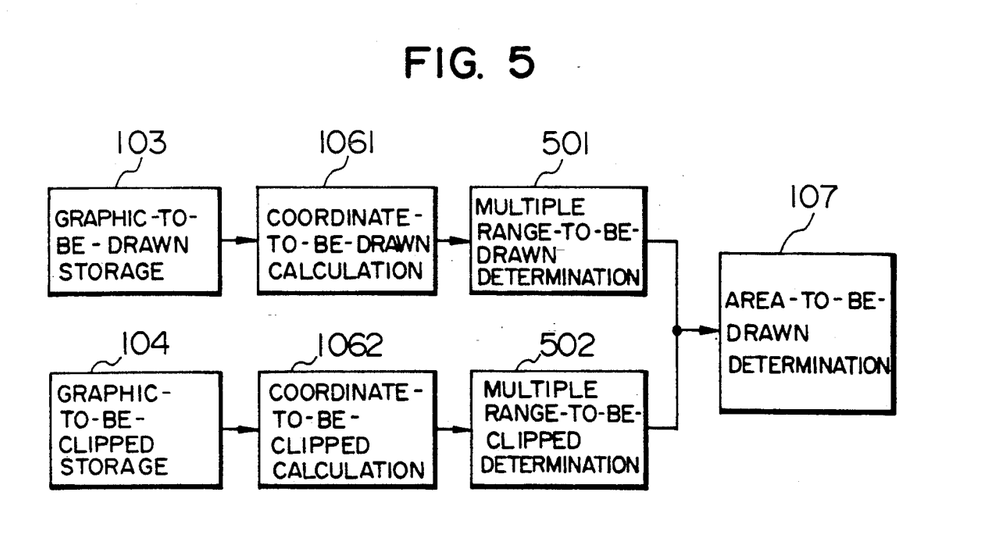
FIG. 5 is a block diagram for explaining a third embodiment according to the present invention.
Figure 6A:
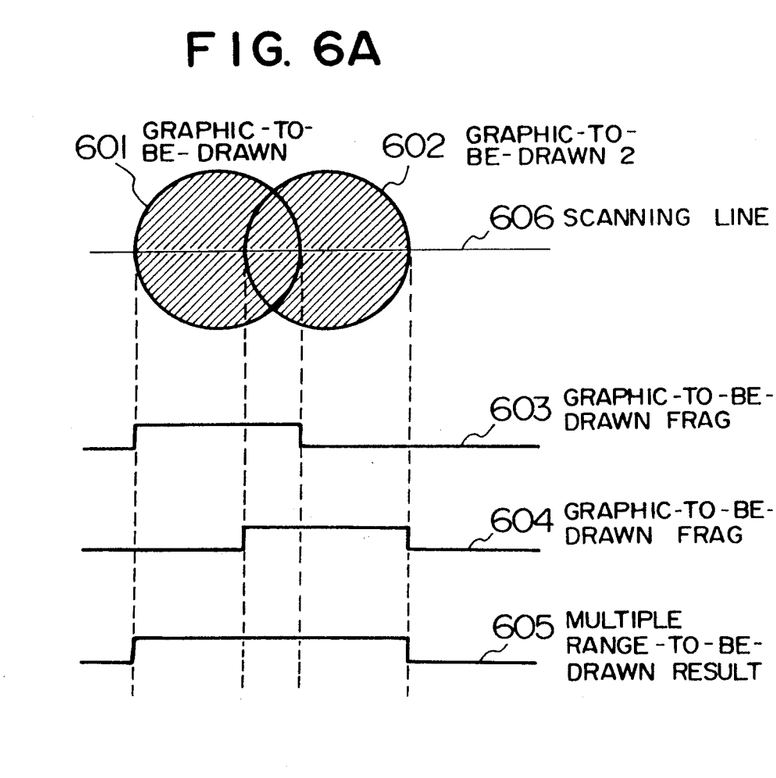
FIGS. 6A-6B are views for explaining an example of the graphic processing method according to the third embodiment of the present invention.
Figure 6B:
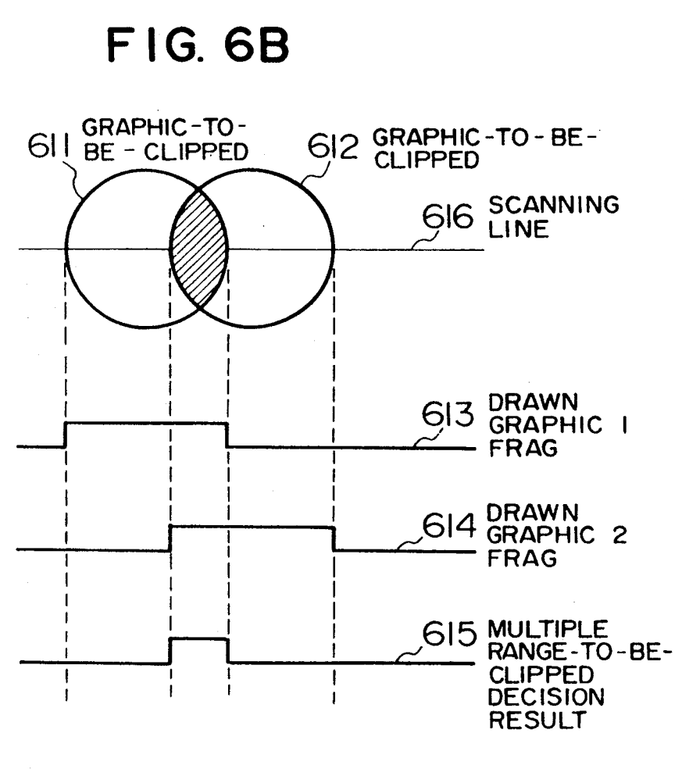

A third embodiment of the present invention will be explained with reference to FIG. 5. In this embodiment, in addition to the arrangement of FIG. 2, there are provided a multiple region-to-be-drawn decision unit 501 and a multiple region-to-be-clipped decision unit 502 in order to process plural drawing graphics and plural clipping graphics. A processing example in this embodiment is shown in FIG. 6.

If there are plural graphics to be drawn, a drawing coordinate calculation unit 1061 calculates the coordinates of the respective graphics to be drawn on each scanning line. First, attributes corresponding to the graphics are added to the coordinates, and a series of these drawing coordinate points are rearranged in the direction of a scanning line. Next, a flag indicative of the region-to-be-drawn for each graphic is prepared and its initial value is set for "OFF". The rearranged coordinates are extracted individually to decide, from the attribute of each coordinate, which graphic the coordinate corresponds to. If that coordinate is a drawing starting point, the flag corresponding to that graphic is made "ON"; if that coordinate is a drawing ending point, the flag corresponding to that graphic is made "OFF". A multiple region-to-be-drawn decision unit 501 determines the coordinate when either one of all the graphic flags turns "ON" to be a drawing starting point and sends it to a graphic area-to-be-drawn decision unit 107. On the other hand, the decision unit 501 determines the coordinate when all the graphic flags turn "OFF" to be a drawing ending point and sends it, to the decision unit 107. In this way, an area to be drawn (a common area, i.e. OR area for the respective graphics) can be acquired on the basis of a series of the coordinate points.

Also in the case where there are plural clipping graphics, a clipping coordinate calculation unit 1062 calculates the coordinates of the respective clipping graphics on each scanning line. First, attributes corresponding to the graphics are added to the coordinates, and a series of these clipping coordinate points are rearranged in the direction of a scanning line. Next, a flag indicative of the clipping region for each graphic is prepared and its initial value is set for "OFF". The rearranged coordinates are extracted individually to determine from the attribute of each coordinate which graphic-to-be-clipped the coordinate corresponds to. If that coordinate is a clipping starting point, the flag corresponding to that graphic-to-be-clipped is made "ON"; if that coordinate is a clipping ending point, the flag corresponding to that graphic-to-be-clipped is made "OFF". A multiple clipping region decision unit 502 decides the coordinate when either all the graphic-to-be-clipped flags turns "ON" to be a clipping starting point and sends it to a graphic area-to-be-drawn decision unit 107. On the other hand, the decision unit 502 decides the coordinate when either one of the graphic flags turns "OFF" to be a clipping ending point and sends it to the decision unit 107. In this way, an area to be clipped (an overlapping area, i.e. AND area for the respective graphics) can be acquired on the basis of a series of the coordinate points.

Although in this embodiment, two drawing or clipping graphics are multiplexed, three or more drawing or clipping graphics multiplexed can be processed in the same way.

We claim:

1. A graphic drawing method comprising the steps of:
    storing data relative to coordinates of a graphic-to-be-drawn and data relative to coordinates of a graphic-to-be-clipped in storage means;
    reading out said data relative to coordinates of said graphic-to-be-clipped from said storage means;
    scanning successively by a scanning line, data relative to coordinates of said graphic-to-be-clipped and said data relative to coordinates of said graphic-to-be-drawn read from said storage means, thereby calculating the coordinates of intersecting points of said scanning line and said graphic-to-be-clipped and coordinates of intersecting points of said scanning line and said graphic-to-be-drawn,
    said calculation step further includes the step of adding, to said coordinate data of intersecting points, attribute data indicating whether said intersecting points belong to said graphic-to-be-clipped or said graphic-to-be-drawn;
    determining an overlapping area of said graphic-to-be-clipped and said graphic-to-be-drawn based upon said coordinates of intersecting points of said scanning line and said graphic-to-be-clipped and said coordinates of intersecting points of said scanning line and said graphic-to-be-drawn,
    said determining step further includes the step of, by using said attribute data, determining an overlapping area of said graphic-to-be-clipped and said graphic-to-be-drawn based upon said coordinates of intersecting points of said scanning line and said graphic-to-be-clipped and said graphic-to-be-drawn, respectively, for each position of said scanning line; and drawing said determined overlapping area of said graphic-to-be-clipped and said graphic-to-be-drawn.

2. A graphic drawing method comprising the steps of:

storing data relative to coordinates of plural graphics which are either a graphic-to-be-clipped or a graphic-to-be-drawn;

reading out said data relative to coordinates of said plural graphics;

scanning successively, by a scanning line, said read out data relative to coordinates of said plural graphics, thereby calculating coordinates of intersecting points of said scanning line and said plural graphics on each position of said scanning line and also adding attribute data to said coordinates of intersecting points, said attribute data indicating to which of said graphic-to-be-clipped and said graphic-to-be-drawn and to which one of said plural graphics said coordinates of interesting points belong;

determining an overlapping or a common area of said plural graphics based upon said data of said intersecting points and their attribute data; and drawing said overlapping area or said common area of said plural graphics.

3. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line, said coordinate calculation means adds attribute data indicating whether said intersecting points belong to said graphic-to-be-drawn or said graphic to be clipped to said calculated coordinate data of intersecting points;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped, said area-to-be-drawn determination means determines an overlapping area of said graphic-to-be-drawn and said graphic-to-be-clipped based upon said coordinates of intersecting points as well as said attribute data; and graphic drawing means for drawing said overlapping area of said graphic-to-be-drawn and said graphic-to-be-clipped.

4. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line;

wherein said graphic-to-be-drawn storage means comprises rearrangement means for adding to said coordinate values, acquired by said coordinate calculation means, attribute values indicating whether said coordinate values belong either to said graphic-to-be-drawn or to said graphic-to-be-clipped, and rearranging said coordinate values in a direction of said scanning line, and determining an overlapping area of said graphic-to-be-drawn and said graphic-to-be-clipped on each position of said scanning line based upon said attributes of the respective coordinate values;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped.

5. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped;

wherein said area-to-be-drawn determination means comprises:

rearrangement means for adding to the respective coordinate values, acquired by said coordinate calculation means, attribute data, determining whether said coordinate values belong either to said graphic-to-be-drawn or said graphic-to-beclipped, and rearranging said coordinate values in a direction of said scanning line;

attribute determination means for successively extracting said coordinate values rearranged by said rearrangement means to determine attributes of said corresponding coordinate points;

area-to-be-clipped determination means for determining whether said coordinate points are a starting point or an ending point of said graphic-to-be-drawn based upon said determination performed by said attribute decision means and said respective coordinate values; and coordinate determination means for determining whether said coordinate points are a starting point or an ending point of said graphic-to-be-drawn based upon said determination performed by said attribute determination means and the respective coordinate values;

wherein an overlapping area of said graphic-to-be-drawn and said graphic-to-be-clipped is determined based upon said determination performed by said area-to-be-clipped determination means and said coordinate determination means.

6. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line;

scanning region setting means for setting said region of scanning to be carried out for said data relative to coordinates of said graphic-to-be-clipped;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped.

7. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line;

scanning region setting means for setting said region of scanning to be carried out for said data relative to coordinates of said graphic-to-be-drawn;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped.

8. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line;

scanning region setting means for setting said region of scanning to be carried out for said data relative to coordinates of said graphic-to-be-clipped and said graphic-to-be-drawn;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped.

9. A graphic drawing device comprising:

graphic-to-be-drawn storage means for storing data relative to coordinates of a graphic-to-be-drawn;

graphic-to-be-clipped storage means for storing data relative to coordinates of a graphic-to-be-clipped specifying an area-to-be-drawn for said graphic-to-be-drawn;

coordinate calculation means for scanning successively by a scanning line said data relative to coordinates of the graphic-to-be-drawn and said data relative to coordinates of the graphic-to-be-clipped read out from both of said storage means, thereby calculating coordinates of intersecting points of said scanning line with said graphic-to-be-drawn and coordinates of intersecting points of said scanning line with said graphic-to-be-clipped for each position of said scanning line, wherein said coordinate calculation means in scanning said coordinate data simultaneously calculations said coordinates of intersecting points of said scanning line and said graphic-to-be-clipped and said coordinates of intersecting points of said scanning line and said graphic-to-be-drawn for each position of said scanning line;

area-to-be-drawn determination means for determining an overlapping area of said graphic-to-be-drawn and said graphic-to-be-clipped based upon said coordinates of intersecting points of said scanning line with said graphic-to-be-drawn and said coordinates of intersecting points of said scanning line with said graphic-to-be-clipped; and graphic drawing means for drawing said overlapping area of said graphic-to-be-drawn and said graphic-to-be-clipped.

10. A graphic processing device comprising:

a main storage device for storing data relative to coordinates of a graphic-to-be-drawn, and data relative to coordinates of a graphic-to-be-clipped specifying an area-to-be-drawn of said graphic-to-be-drawn;

a graphic drawing control device for scanning successively, by a scanning line, said data relative to coordinates of said graphic-to-be-clipped and said data relative to coordinates of said graphic-to-be-drawn read out from said main storage device, thereby calculating coordinates of intersecting points of said scanning line and said graphic-to-be-clipped and coordinates of intersecting points of said scanning line and said graphic-to-be-drawn for each position of said scanning line, determining an overlapping area of said graphic-to-be-clipped and said graphic-to-be-drawn based upon said coordinates of said intersecting points, and producing said overlapping area as graphic data based upon said coordinates of said intersecting points;

a frame memory for temporarily storing as graphic data said overlapping area constituted as said graphic data by said drawing control device prior to drawing it; and a graphic drawing device for drawing said overlapping area stored in said frame memory.

11. A graphic processing device comprising:

first storage means for storing data relative to coordinates of a first graphic;

second storage means for storing data relative to coordinates of a second graphic;

coordinate calculation means for scanning successively by a scanning line, said data relative to coordinates of said first graphic and said data read relative to coordinates of said second graphic, read out from both first and second storage means respectively, thereby calculating coordinates of intersecting points of said scanning line and said first graphic and coordinates of intersecting points of said scanning line and said second graphic for each position of said scanning line;

area-to-be-drawn determination means for determining an overlapping area or a common area (OR area) of said first graphic and said second graphic on the basis of said coordinates of intersecting points of said scanning line and said first graphic and said coordinates of intersecting points of said scanning line and said second graphic; and graphic drawing means for drawing said overlapping area or common area of said first graphic and said second graphic.

12. A graphic processing device comprising:

storage means for storing data relative to coordinates of plural graphics which are either a graphic-to-be-clipped, specifying an area to be drawn, or a graphic-to-be-drawn, the area of which is to be drawn;

coordinate calculation means for scanning successively said plural graphics by a scanning line for the data relative to coordinates of said plural graphics read out from said storage means, thereby calculating coordinates of intersecting points of said scanning line and said plural graphics on each position of said scanning line and also adding attribute data to said coordinates of intersecting points, said attribute data indicating to which of aid graphic-to-be-clipped and said graphic-to-be-drawn and to which one of said plural graphics said coordinates belong;

area-to-be-drawn determination means for deciding an overlapping area (AND area) or a common area (OR area) of said plural graphics based upon said data of said intersecting points and their respective attribute data; and graphic drawing means for drawing said overlapping area or said common area of said plural graphics determined by said area-to-be-drawn determination means.

* * * * *